(12) United States Patent
Huang

(10) Patent No.: US 8,690,344 B2
(45) Date of Patent: Apr. 8, 2014

(54) ILLUMINATION SYSTEM AND PROJECTION DEVICE HAVING A WHEEL PLATE INCLUDING A WAVE BAND TRANSFORMING AREA AND A REFLECTING AREA

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 91 days.

(21) Appl. No.: 13/324,496

(22) Filed: Dec. 13, 2011

(65) Prior Publication Data

US 2012/0147332 A1  Jun. 14, 2012

(30) Foreign Application Priority Data

Dec. 14, 2010  (TW) ................. 99143619 A

(51) Int. Cl.
*G03B 21/00* (2006.01)
(52) U.S. Cl.
USPC ............ 353/31; 353/20; 353/30; 353/84; 353/85; 353/99; 362/243; 362/293; 359/484.09; 359/485.06; 359/485.07
(58) Field of Classification Search
USPC ........... 353/20, 22, 30, 31, 33, 37, 38, 81, 84, 353/85, 94, 99; 359/484.09, 485.02, 359/485.06, 485.07; 362/235, 243, 293, 362/583; 349/5, 7–9
See application file for complete search history.

(56) References Cited

U.S. PATENT DOCUMENTS

| | | | |
|---|---|---|---|
| 7,547,114 B2 | 6/2009 | Li et al. | |
| 7,651,243 B2 | 1/2010 | McGuire, Jr. et al. | |
| 7,959,305 B2 * | 6/2011 | Destain | 353/99 |
| 2007/0146639 A1 | 6/2007 | Conner | |
| 2008/0100533 A1 | 5/2008 | Chuang et al. | |
| 2009/0009730 A1 | 1/2009 | Destain | |

(Continued)

FOREIGN PATENT DOCUMENTS

| | | |
|---|---|---|
| CN | 1847971 | 10/2006 |
| CN | 101364037 | 2/2009 |

(Continued)

OTHER PUBLICATIONS

Office Action from corresponding Taiwanese Appln. No. 099143619 dated May 14, 2013. Partial English translation attached.

(Continued)

*Primary Examiner* — Sultan Chowdhury
(74) *Attorney, Agent, or Firm* — Grossman, Tucker, Perreault & Pfleger, PLLC

(57) ABSTRACT

An illumination system and a projection device comprising the same are provided. The projection device further comprises an imaging system. The illumination system comprises a first light source, a dichroic element and a wheel plate. The dichroic element comprises a first dichroic portion and a second dichroic portion. The first light source provides a first wave band light, which is reflected to the wheel plate by the first dichroic portion. When being projected onto a wave band transforming area of the wheel plate, the first wave band light will be transformed into a second wave band light by the wave band transforming area and then emits through the first dichroic portion and the second dichroic portion. When being projected onto a reflecting area of the wheel plate, the first wave band light will be reflected by the reflecting area to emit through the second dichroic portion.

16 Claims, 5 Drawing Sheets

(56) References Cited

U.S. PATENT DOCUMENTS

| | | |
|---|---|---|
| 2009/0034284 A1 | 2/2009 | Li et al. |
| 2009/0040463 A1 | 2/2009 | Chen et al. |
| 2010/0328616 A1* | 12/2010 | Silverstein et al. ............ 353/31 |
| 2011/0116051 A1* | 5/2011 | Young et al. ................. 353/31 |
| 2012/0062857 A1* | 3/2012 | Saitou et al. .................. 353/98 |

FOREIGN PATENT DOCUMENTS

| | | |
|---|---|---|
| CN | 101836160 | 9/2010 |
| JP | 2007-322852 | 12/2007 |
| JP | 2009-128689 | 6/2009 |
| TW | 200731838 | 8/2007 |
| TW | 200820768 | 5/2008 |
| WO | 2006/109232 | 10/2006 |

OTHER PUBLICATIONS

Office Action from corresponding Chinese Appln No. 201010624724.5 dated Nov. 4, 2013. Partial English translation attached.

* cited by examiner

ILLUMINATION SYSTEM AND PROJECTION DEVICE HAVING A WHEEL PLATE INCLUDING A WAVE BAND TRANSFORMING AREA AND A REFLECTING AREA

This application claims the benefit from the priority to Taiwan Patent Application No. 099143619 filed on Dec. 14, 2010, the disclosure of which are incorporated by reference herein in its entirety.

CROSS-REFERENCES TO RELATED APPLICATIONS

Not applicable.

BACKGROUND OF THE INVENTION

1. Field of the Invention

The present invention relates to an illumination system and a projection device comprising the illumination system. In particular, the present invention relates to an illumination system for transforming a wavelength of a specific wave band light and a projection device using the illumination system.

2. Descriptions of the Related Art

With the gradual improvement in technologies for manufacturing projection devices over recent years, lightweight and slim projection devices have now become the mainstream product in the market. Demands for better designs in the market require the continuous improvement on the design of the projection devices; and accordingly, projection device manufacturers must make great efforts to develop various projection devices that have a smaller volume, a higher efficiency and a better imaging quality to meet the demands in the market.

Referring to FIG. 1 there is shown an illumination system 11 of a projector 1 in the prior art. Instead of conventionally using a single light source to project a light onto a color wheel coated with a fluorescent material, the illumination system 11 utilizes a blue solid-state light source 111, a red light emitting diode (LED) 112 and a wavelength transforming element 113 comprising a green phosphor material and focuses the reflected/transformed light to an imaging system to form an image. However, in the illumination system 11, the blue light can be coupled with the green light and the red light only after being reflected multiple times. As a result, the light energy of the blue light will be attenuated considerably after the multiple reflections. Furthermore, the light emitted by the LED is a scattered light, so multiple light condensing lenses are required to condense the light to improve the light emitting efficiency. Consequently, the projector 1 needs a large internal space to accommodate the multiple light condensing elements, which contradicts the demands for lightweight and slim projectors in the market.

Accordingly, efforts still have to be made in the art to provide a projection device which has an efficient illumination system but a small volume and is also capable of reducing the light energy waste.

SUMMARY OF THE INVENTION

An objective of the present invention is to provide an illumination system, which can be used in a projection device to achieve the objective of miniaturizing the projection system and improving the light emitting efficiency of the projection device.

To achieve the aforesaid objective, the present invention provides a projection device, which comprises an imaging system and an illumination system. The illumination system comprises a first light source, a dichroic element and a wheel plate. The first light source provides a first wave band light. The dichroic element has a first dichroic portion and a second dichroic portion. The wheel plate has a wave band transforming area and a reflecting area. The first wave band light is reflected to the wheel plate by the first dichroic portion. When the first wave band light is reflected to the wave band transforming area, the first wave band light is transformed into a second wave band light by the wave band transforming area, and the second wave band light is emitted through the first dichroic portion and the second dichroic portion. When the first wave band light is reflected to the reflecting area, the first wave band light is reflected by the reflecting area to emit through the second dichroic portion. Then, the imaging system forms an image with the light provided by the illumination system.

According to the above descriptions, the illumination system of the present invention can make the optimal use of the light source to increase the luminance of a display frame of the projection device using the illumination system of the present invention. Moreover, the projection device using the illumination system of the present invention further avoids both the overuse of energy and an increased volume of the projection device caused by too complex arrangement of illumination components.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. The present invention relates to an illumination system and a projection device using the illumination system. The projection device may be a device with projection and displaying functions such as a digital light processing (DLP) projection display or a liquid crystal display (LCD) projection display. It shall be appreciated that in the following embodiments and the attached drawings, the description of these embodiments is only for the purpose of illustration rather than to limit the present invention. Meanwhile, in the following embodiments and the attached drawings, elements not directly related to the present invention are omitted from depiction; and dimensional relationships among individual elements in the attached drawings are illustrated only for ease of understanding but not to limit the actual scale.

Figure 1:
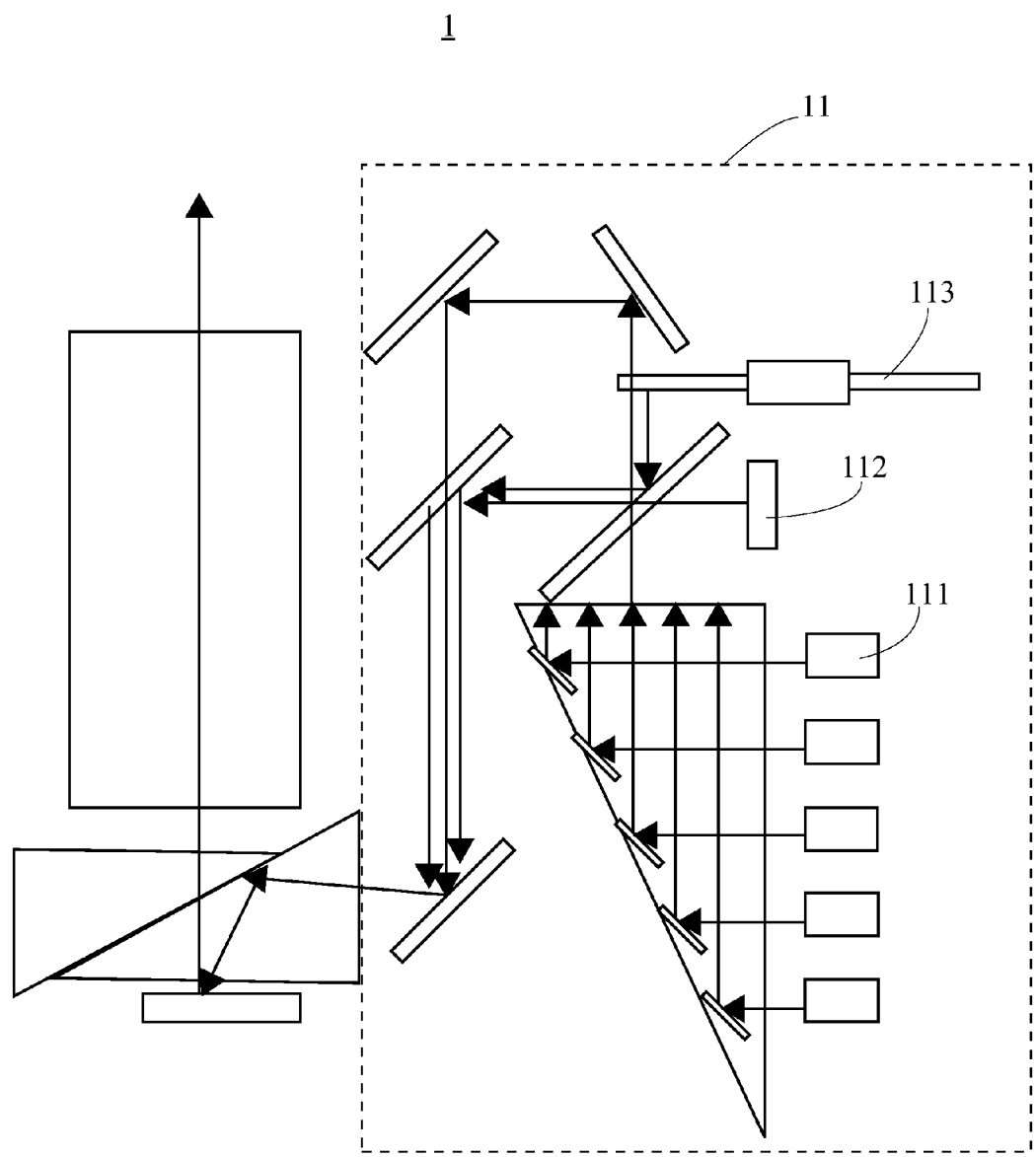
FIG. 1 is a schematic view of a projection device in the prior art.
Figure 2:
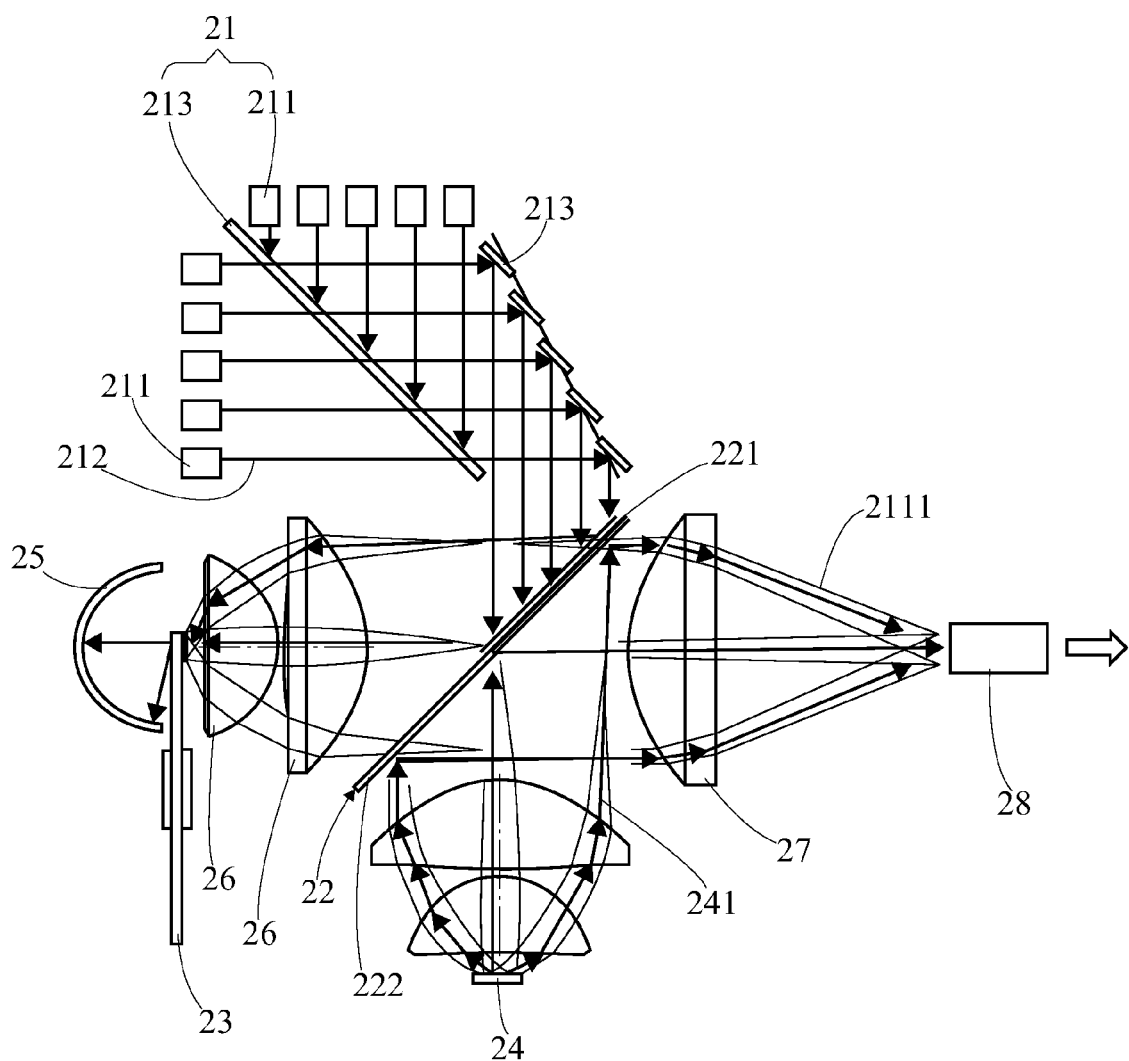
FIG. 2 is a schematic view of a projection device according to a first embodiment of the present invention.

The first embodiment of the present invention is an illumination system 2 for a projection device (not shown), which is schematically shown in FIG. 2. The projection device comprises the illumination system 2 and an imaging system (not shown). The illumination system 2 of the projection device is adapted to provide a light and output the light to the imaging system so that the imaging system forms the light into an image to display a projection frame. In the first embodiment of the present invention, the illumination system 2 comprises a first light source 21, a dichroic element 22, a wheel plate 23, a second light source 24, a light recycling element 25, two first light condensing elements 26, a second light condensing element 27 and a light collecting element 28.

Figure 3:
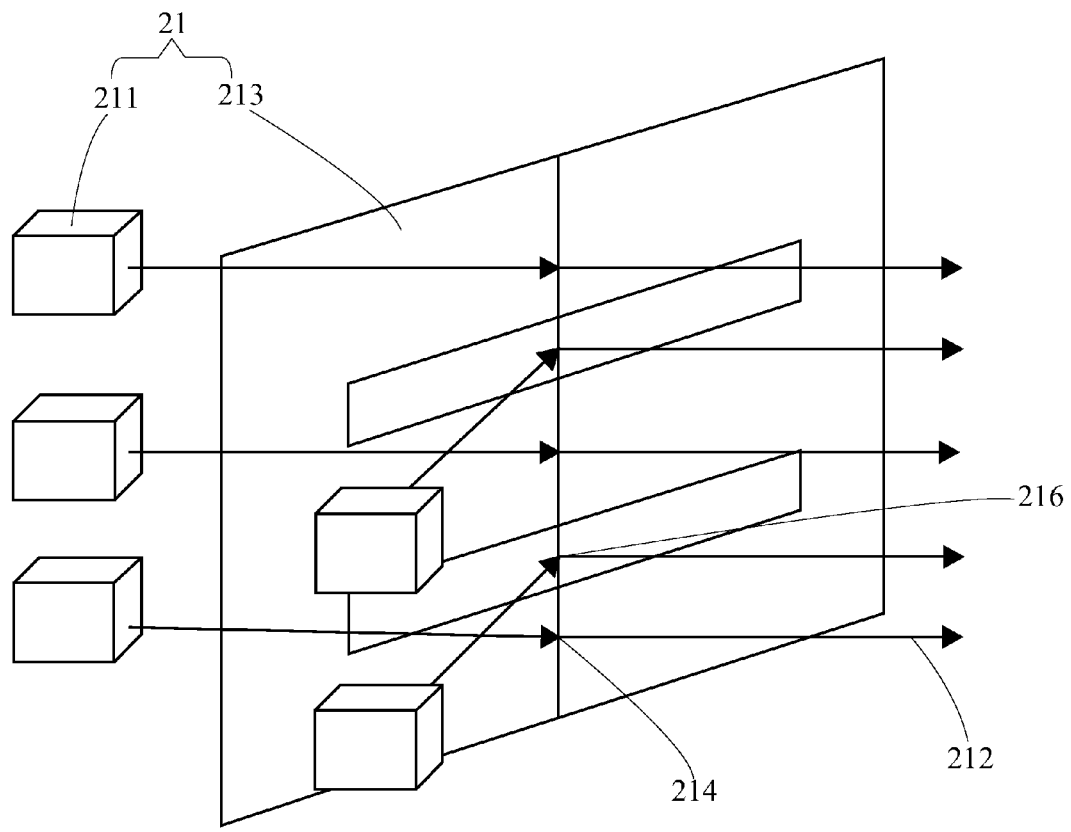
FIG. 3 is a schematic view of a first light source of the projection device according to the first embodiment of the present invention.

Referring to FIG. 2, the first light source 21 comprises a plurality of blue laser light sources 211 and a plurality of reflecting mirrors 213, and is adapted to provide a plurality of first wave band lights 212 within a blue wave band range. FIG. 3 is a schematic view of the first light source 21 in FIG. 2. By means of transparent portions 214 and reflecting portions 216 of the reflecting mirrors 213, the first wave band lights 212 can be concentrated and emitted towards the same direction. In this way, the light intensity of the first wave band lights 212 can be reinforced. However, it shall be appreciated that the arrangement of the first light source of the present invention is not limited to what is described above, and people skilled in the art may also replace it with some other light source structure.

The second light source 24 comprises a red light emitting diode (LED), and is adapted to provide a third wave band light 241 within a red wave band range. The second light source 24 may also be provided with light condensing elements (i.e., the light condensing lenses as shown in FIG. 2) correspondingly to project the light in a more concentrated way.

The dichroic element 22 has a first dichroic portion 221 and a second dichroic portion 222. The first dichroic portion 221 reflects both the first wave band lights 212 and the third wave band light 241 and allows a second wave band light 2111 to pass therethrough. The second dichroic portion 222 allows both the first wave band lights 212 and the second wave band light 2111 to pass therethrough and reflects the third wave band light 241. In this embodiment, the second wave band light 2111 is a light within a green wave band range. In other words, when being projected to the dichroic element 22, the first wave band lights 212 (blue lights) are reflected by the dichroic element 22 and then focused onto the wheel plate 23 by the first light condensing elements 26; when being projected onto the dichroic element 22, the second wave band light 2111 (a green light) passes through the first dichroic portion 221 and the second dichroic portion 222 straightforwardly; and when being projected to the dichroic element 22, the third wave band light 241 (a red light) is reflected by the first dichroic portion 221 and the second dichroic portion 222.

The first wave band lights 212 reflected by the first dichroic portion 221 are condensed and projected by the first light condensing elements 26 to a wave band transforming area 231 or a reflecting area 232; and in this embodiment, the first light condensing elements 26 are convex lenses. In other examples of the present invention, other numbers, forms or materials of the light condensing element(s) may readily occur to people skilled in the art.

Figure 4:
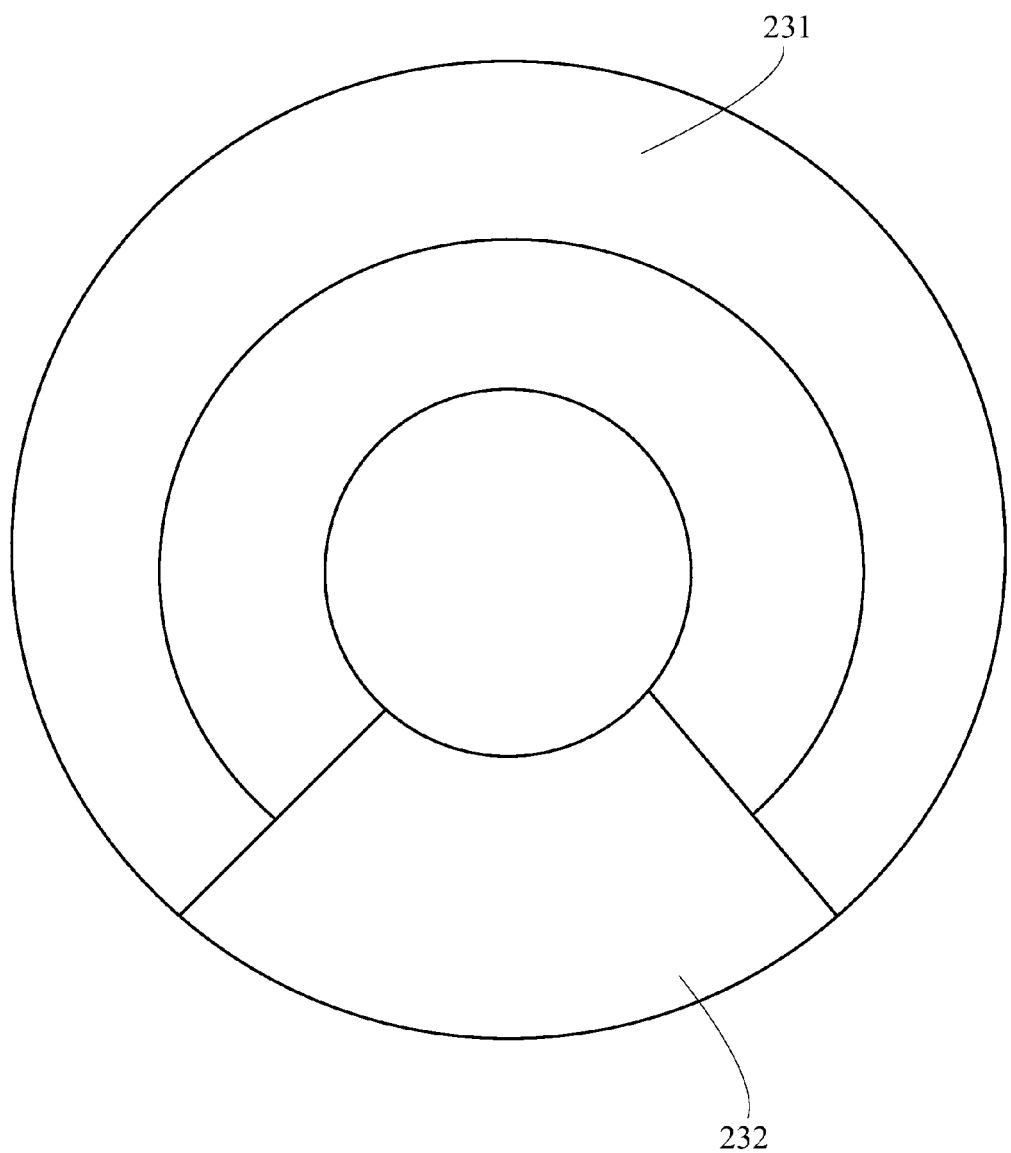
FIG. 4 is a schematic view of a wheel plate of the projection device according to the first embodiment of the present invention.

Referring to FIG. 2 and FIG. 4 together, FIG. 4 is a schematic view of the wheel plate 23 in FIG. 2. The wheel plate 23 has a wave band transforming area 231 and a reflecting area 232. The wave band transforming area 231 is coated with a green phosphor material and is adapted to transform the first wave band lights 212 into the second wave band light 2111.

The reflecting area 232 is adapted to reflect the first wave band lights 212. The second wave band light 2111 obtained through the transformation by the wave band transforming area 231 passes through the first dichroic portion 221 and the second dichroic portion 222 straightforwardly and is then focused by the second light condensing element 27; the first wave band lights 212 reflected by the reflecting area 232 pass through the second dichroic portion 222 straightforwardly and are then focused by the second light condensing element 27. In the present invention, the reflecting area may be coated with a reflective material or be directly made of a reflecting mirror.

In the wheel plate of the present invention, an area of the wave band transforming area 231 and an area of the reflecting area 232 are related to a duty cycle of the second light source 24. In this embodiment, an area ratio of the wave band transforming area 231 and the reflecting area 232 on the wheel plate 23 is 2:1; and people skilled in the art can appropriately adjust the area ratio of individual areas on the wheel plate according to the required light intensity and color presentation.

The first wave band lights 212 or the second wave band light 2111 passing through the wave band transforming area 231 are reflected and focused onto the wave band transforming area 231 by the light recycling element 25 to be re-transformed into the second wave band light 2111.

All the lights passing through or reflected by the dichroic element 22 are focused onto an incident end of the light collecting element 28 by the second light condensing element 27. In this embodiment, the second light condensing element 27 is a convex lens. In other examples of the present invention, other numbers, forms or materials of the light condensing element(s) may readily occur to people skilled in the art. Furthermore, the light collecting element 28 of the present invention may be a light tunnel or an integration rod.

Hereinafter, the operation mechanism of the illumination system 2 of this embodiment will be described in detail.

When the first light source 21 is turned on and the second light source 24 is turned off, the blue laser light sources 211 of the first light source 21 emit the first wave band lights 212. The first wave band lights 212 are all guided to the first dichroic portion 221 by the reflecting mirrors 213 and then reflected by the first dichroic portion 221 to the first light condensing elements 26, which then focus the first wave band lights 212 onto the reflecting area 232 of the wheel plate 23. Then, the first wave band lights 212 are reflected by the reflecting area 232 to pass through the second dichroic portion 222, and are then focused by the second light condensing element 27 onto the light collecting element 28 for homogenization. Thereby, the homogenized first wave band lights 212 are provided to the imaging system to form an image.

Similarly, when the first light source 21 is turned on and the second light source 24 is turned off, the blue laser light sources 211 of the first light source 21 emit the first wave band lights 212. The first wave band lights 212 are all guided towards the same direction by the reflecting mirrors 213 and are then reflected by the first dichroic portion 221 to the first light condensing elements 26, which then focus the first wave band lights 212 onto the wave band transforming area 231 of the wheel plate 23. Then, the first wave band lights 212 are transformed into the second wave band light 2111, which passes back through the first light condensing elements 26, the first dichroic portion 221 and the second dichroic portion 222 of the dichroic element 22 and is then focused by the second light condensing element 27 onto the light collecting element 28 for homogenization. Thereby, the homogenized second wave band light 2111 is provided to the imaging system to form an image.

Here, it shall be particularly noted that when the first wave band lights 212 are focused onto the wave band transforming area 231, a fraction of the first wave band lights 212 or a part of the second wave band light 2111 passes through the wave band transforming area 231 to result in a waste of light. Therefore, the light recycling element 25 is provided behind the wheel plate 23 to reflect and focus the first wave band lights 212 or the second wave band light 2111 passing through the wave band transforming area 231 onto the wave band transforming area 231 so that the first wave band lights 212 or the second wave band light 2111 are re-transformed into the second wave band light 2111. The second wave band light 2111 passes through the first light condensing elements 26 and the dichroic element 22 in sequence and is focused onto the light collecting element 28 by the second light condensing element 27 so as to be provided to the imaging system to form an image. In this way, the light can be recycled to avoid loss of the light. In this embodiment, the light recycling element 25 is a curved reflecting mirror.

When the first light source 21 is turned off and the second light source 24 is turned on, the third wave band light 241 is provided by the second light source 24 directly. In this case, the third wave band light 24 is condensed to the dichroic element 22, and is reflected by the first dichroic portion 221 and the second dichroic portion 222. Then, the third wave band light 24 is focused by the second light condensing element 27 onto the light collecting element 28 for homogenization so as to be provided to the back-end imaging system to form an image.

Hence, finally, the first wave band lights 212 within the blue wave band range, the second wave band light 2111 within the green wave band range and the third wave band light 241 within the red wave band range are outputted by the light collecting element 28 to the imaging system so that, with the first wave band lights 212, the second wave band light 2111 and the third wave band light 241, the imaging system forms an image and displays a projection frame.

Figure 5:
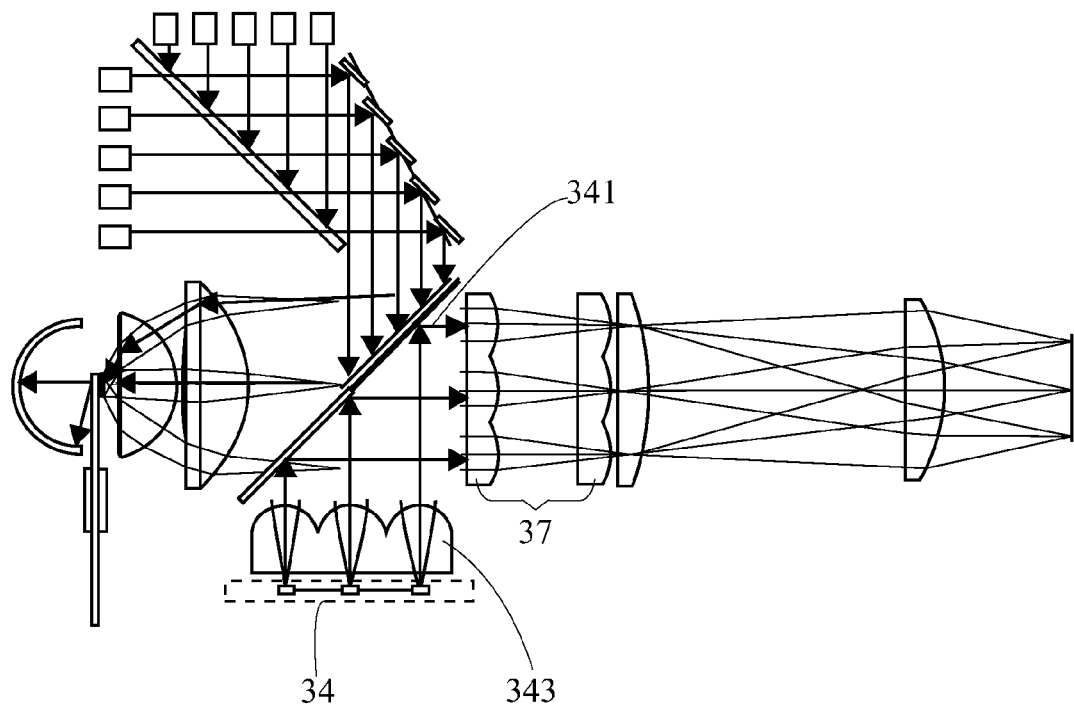
FIG. 5 is a schematic view of a projection device according to a second embodiment of the present invention.

Referring to FIG. 5 together, there is shown a second embodiment of the present invention. This embodiment is also an illumination system 3 for a projection device (not shown). The projection device comprises the aforesaid illumination system 3 and an imaging system (not shown).

The illumination system 3 of this embodiment is roughly the same as that of the first embodiment, and mainly differs from that of the first embodiment in that, the red LED used in the second light source 24 of the first embodiment is replaced with a red LED array as a second light source 34 to provide a third wave band light 341 with an improved light intensity; furthermore, in this embodiment, the second light source 34 further comprises a collimating lens array 343 correspondingly for use as a collimating element to specially collimate the third wave band light 341 provided by the red LED array.

As compared to the first embodiment where the second condensing element 27 is used to focus all the lights passing through or reflected by the dichroic element 22 to the incident end of the light collecting element 28, this embodiment uses a pair of lens arrays to form a light collecting lens array module 37, which focuses the light onto the light collecting element 38 for homogenization so that the homogenized light is provided to the back-end imaging system to form an image. Apart from this, corresponding positional and operational relationships among other elements are all identical to those of the first embodiment, and thus will not be further described herein.

The kinds, quantities and positions of the elements in the aforesaid embodiments can be adjusted as needed. For example, in each of the embodiments, a light condensing element may be added between individual optical elements to have the light travel in a more concentrated way to reduce loss of the light. Furthermore, the reflecting mirrors may be omitted so that the blue laser light from the first light source projects to the first dichroic portion directly. The wheel plate may also be coated with a phosphor material of any other color to obtain a different color or luminance so that the color of the image is more vivid or the luminance is further improved. The light recycling element may be omitted, and instead, the backside of the wave band transforming area is coated with a coating film which reflects the first wave band lights and transmits the second wave band light so that the first wave band lights passing through the wave band transforming area of the wheel plate are reflected while the second wave band light is transmitted. Alternatively, the second light source uses red laser light sources instead to render the third wave band light more concentrated.

According to the above descriptions, instead of using a single light source to project a light to a color wheel, the illumination system of the present invention, with the minimum volume, uses the blue laser light sources, the red LED and the wave band transforming area having the green phosphor material that are independent of each other. As compared to the illumination system of the prior art, this effectively increases the light intensity; and as the need of complex optical elements is eliminated, the overall volume is further reduced. Furthermore, instead of using a green LED, the illumination system of the present invention can utilize interaction between a blue LED and the wave band transforming area having the green phosphor material to generate a green light, so the light intensity of the green light gets improved, thereby overcoming the problem of the low green light emitting efficiency due to use of the green LED in the conventional illumination system. Thereby, with the illumination system of the present invention, the problem existing in the conventional projection device is significantly improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. An illumination system, comprising:
a first light source, providing a first wave band light;
a dichroic element, having a first dichroic portion and a second dichroic portion;
a wheel plate, having a wave band transforming area and a reflecting area,
wherein the first wave band light is reflected to the wheel plate by the first dichroic portion, and when the first wave band light is reflected to the wave band transforming area, the first wave band light is transformed into a second wave band light by the wave band transforming area, and the second wave band light emits through the first dichroic portion and the second dichroic portion, and when the first wave band light is reflected to the reflecting area, the first wave band light is reflected by the reflecting area to emit through the second dichroic portion; and a second light source which provides a third wave band light, and the third wave band light is reflected by the dichroic element;

wherein the first dichroic portion allows the second wave band light to pass therethrough and reflects the first wave band light and the third wave band light, and the second dichroic portion allows the first wave band light and the second wave band light to pass therethrough and reflects the third wave band light.

2. The illumination system as claimed in claim 1, wherein the illumination system further comprises a light recycling element, the light recycling element reflects and focuses the first wave band light, passing through the wave band transforming area, to the wave band transforming area to be transformed into the second wave band light.

3. The illumination system as claimed in claim 1, further comprising a first light condensing element to focus the first wave band light, reflected by the first dichroic portion, on the wave band transforming area or the reflecting area.

4. The illumination system as claimed in claim 1, further comprising a second light condensing element and a light collecting element, wherein the second light condensing element focuses the second wave band light passing through the first dichroic portion, the first wave band light and the second wave band light passing through the second dichroic portion, and the third wave band light reflected by the first dichroic portion and the second dichroic portion onto the light collecting element.

5. The illumination system as claimed in claim 1, wherein the second wave band light is a green light.

6. The illumination system as claimed in claim 5, wherein the wave band transforming area is coated with a green phosphor material.

7. The illumination system as claimed in claim 1, wherein an area ratio of the wave band transforming area and the reflecting area on the wheel plate is 2:1.

8. The illumination system as claimed in claim 1, wherein the first light source comprises a plurality of blue laser light sources, and the first wave band light is a blue light.

9. The illumination system as claimed in claim 7, wherein the first light source further comprises a plurality of reflecting mirrors.

10. The illumination system as claimed in claim 1, wherein the second light source comprises a red light emitting diode (LED) array and a corresponding collimating lens array, and the third wave band light is a red light.

11. The illumination system as claimed in claim 9, further comprising a light collecting lens array module and a light collecting element, wherein the light collecting lens array module focuses the second wave band light passing through the first dichroic portion, the first wave band light and the second wave band light passing through the second dichroic portion, and the third wave band light reflected by the first dichroic portion and the second dichroic portion onto the light collecting element for homogenization.

12. The illumination system as claimed in claim 1, wherein an area of the wave band transforming area and an area of the reflecting area are related to a duty cycle of the second light source.

13. The illumination system as claimed in claim 4, wherein the light collecting element is a light tunnel or an integration rod.

14. A projection device, comprising:
an illumination system configured to provide a light beam, said illumination system comprising:
a first light source, providing a first wave band light;
a dichroic element, having a first dichroic portion and a second dichroic portion;
a wheel plate, having a wave band transforming area and a reflecting area,
wherein the first wave band light is reflected to the wheel plate by the first dichroic portion, and when the first wave band light is reflected to the wave band transforming area, the first wave band light is transformed into a second wave band light by the wave band transforming area, and the second wave band light emits through the first dichroic portion and the second dichroic portion, and when the first wave band light is reflected to the reflecting area, the first wave band light is reflected by the reflecting area to emit through the second dichroic portion; and
a second light source which provides a third wave band light, and the third wave band light is reflected by the dichroic element;
wherein the first dichroic portion allows the second wave band light to pass therethrough and reflects the first wave band light and the third wave band light, and the second dichroic portion allows the first wave band light and the second wave band light to pass therethrough and reflects the third wave band light; and
an imaging system, forming an image with the light beam provided by the illumination system.

15. The projection device as claimed in claim 14, wherein the light beam comprises a first wave band light, a second wave band light and a third wave band light.

16. The illumination system as claimed in claim 10, wherein the light collecting element is a light tunnel or an integration rod.

* * * * *